United States Patent

[11] 3,616,958

| [72] | Inventor | Orson L. Mitchell<br>132 Ronada Ave., Piedmont, Calif. 94611 |
|---|---|---|
| [21] | Appl. No. | 816,744 |
| [22] | Filed | Apr. 16, 1969 |
| [45] | Patented | Nov. 2, 1971 |

[54] SEPARABLE PRESSURE TANK APPARATUS
3 Claims, 8 Drawing Figs.

[52] U.S. Cl................................................... 220/3,
220/46 R, 220/83, 220/55 AN
[51] Int. Cl....................................................... B65d 7/00,
B65d 53/00, B65d 1/22
[50] Field of Search............................................ 220/46, 3,
55–60, 83, 9; 285/330, DIG. 14, DIG. 15

[56] References Cited
UNITED STATES PATENTS

| 2,553,220 | 5/1948 | Troger.......................... | 285/330 |
| 1,457,155 | 5/1923 | Fey............................... | 220/5 |
| 2,353,572 | 7/1944 | Kuster et al................... | 285/330 X |
| 2,417,195 | 3/1947 | Hargreaves.................... | 220/55 O |
| 2,439,161 | 4/1948 | Dubois ......................... | 220/55 O |
| 2,472,620 | 6/1949 | Rhodes et al. ................ | 220/55 |
| 2,608,318 | 8/1952 | Keller............................ | 220/46 X |
| 2,731,280 | 1/1956 | Goodliffe et al. .............. | 220/5 X |
| 2,936,093 | 5/1960 | Passalaqua .................... | 220/46 X |
| 3,092,285 | 6/1963 | Cox............................... | 220/55 O |
| 3,282,459 | 11/1966 | Wilson .......................... | 220/3 |

FOREIGN PATENTS

| 1,179,889 | 10/1964 | Germany....................... | 220/55 AN |

Primary Examiner—Raphael H. Schwartz
Attorneys—R. I. Tompkins and Paul N. Critchlow ABSTRACT: Pressure tank apparatus designed for pressure testing various samples must provide a quick and easy manner of mounting the specimen within the tank and of removing it subsequent to the testing procedure. Also, the pressure tanks should be as lightweight as possible consistent with the anticipated extreme pressures. Lightness and strength presently are provided by utilizing two-part tanks each formed with a special merlon-flange type permitting coupling of the two parts to form a sealed tank unit. A series of tanks are used, these tanks being concentrically spaced one from another to provide intervening chambers subjected to progressive pressure conditions permitting the tank walls to be subjected only to the pressure differential of adjacent chambers rather than the full pressure in any one chamber. Consequently, wall thickness and strength can be reduced. Each half of the two-part assembly has a closed end and a substantially cylindrical free end portion, the periphery of which is formed with merlon-type flanges spaced one from another by crenel-type notches. The spacing permits mating of the two parts by inserting the flanges of one part into the notches of the other and the flanges are provided with transverse recesses which, when the parts are mated, cumulatively form an outwardly facing, intermittent, circumferential channel adapted to receive a lock ring. If necessary, a clamping ring maintains the lock ring and an interior seal for the tank is provided by utilizing the interior pressure to press a sealing member tightly against the circumferential intermittent channel surface area.

INVENTOR.
ORSON L. MITCHELL

SEPARABLE PRESSURE TANK APPARATUS

The invention described herein may be manufactured and used by or for the Government of The United States of America for governmental purposes without the payment of any royalties thereon or therefor.

BACKGROUND OF THE INVENTION

The present invention relates to pressure tank systems and, in particular, to a so-called series pressure tank system utilizing a series of concentrically arranged tanks, the sidewalls of which are subjected to a net differential pressure to minimize weight and strength requirements.

Conventional high-pressure vessels normally use a single wall construction which requires massive forgings and thick walls to resist the extreme pressures. Likewise, the closure mechanisms for these vessels are massive, costly and difficult to use. Although improved techniques, such as the shrink-fitting of tubes to form the pressure vessels have been applied, these techniques are exacting and difficult and the final item still presents itself as one massive chunk of steel.

The series-type pressure vessel systems provide a manner in which the vessel wall thickness can be materially reduced and the overall weight substantially minimized. As already indicated, such systems employ a number of tanks concentrically disposed one within another, the tanks being spaced to provide chambers which can be charged with successively increasing or decreasing pressures so that the tank walls need only be of sufficient strength to resist the net or differential pressure in the chambers on either of its sides. Such a system is disclosed in an early U.S. Pat. No. 339,885 issued Apr. 13, 1886 to E. Hill "MOde of Reenforcing Tubular or Hollow Structures." However, this early disclosure applies to special structures for holding air or gas under pressure and such structures differ materially from test vessel systems which require frequent mounting of the test specimen within one of the tanks and subsequent removal of the specimen after the test has been completed. As will be appreciated, one major problem in utilizing a series-type system as a specimen testing pressure arrangement resides in providing a quick and easy closure for the tanks so that assembly and disassembly for test purposes can be accomplished in a practical and expeditious manner.

It is therefore an object of the present invention to provide a high-pressure vessel utilizing a single wall construction, the vessel or tank being formed of separable parts and the arrangement for interconnecting the parts being relatively light and adequately strong to resist the extreme pressures, as well as being of simple construction capable of relatively quick and easy assembly and disassembly.

Another object is to provide a series-tank pressure vessel system utilizing two-part tanks each having the interconnecting arrangement described in the foregoing object.

Another object is to provide a system in accordance with the foregoing objects in which the interconnections for the tanks can be achieved without any special tools or fastening members.

Yet another object is to provide a simple and effective sealing arrangement for the tanks.

A more general object is to provide a type of high-pressure vessel or tank which permits substantial reduction in material, construction and handling cost.

A further general object is to provide a system which utilizes the series-tank arrangement and which is, in effect, open at each end to the extent that additional tanks can be added as required either externally or internally of the system.

Other objects and their attendant advantages will become more apparent in the ensuing description.

SUMMARY OF THE INVENTION

The objects of the invention are achieved by providing a casing formed of two parts, each part having a closed end portion preferably hemispherical in contour and a substantially cylindrical free end portion. The free end portions engage one with the other to form the casing and these end portions are themselves formed with special interconnecting elements. In particular, the peripheral edge of the cylindrical free end portions are formed with so-called merlon flanges interspaced by crenel notches to form what appears to be a ridged or parapet-like contour at these free ends. The merlon flanges of one part mate with the crenel notches of the other and the mating is interlocked by providing the merlon flanges of each part with transversely extending recesses. The recesses are so disposed that, when the mating occurs, the recesses of one part align with those of the other to provide a circumferentially extending, outwardly facing, intermittent channel in which a lock ring can be mounted. Means are provided for radially retaining the lock ring and sealing means are disposed interiorly of the casing for sealing the intermittent channel and permitting the assembled casing to be pressurized. In the series-type pressure tank systems, each of the concentrically arranged tanks is formed with the merlon and crenel interconnections and, when the tanks are assembled in their concentric arrangement and pressurized, the wall spacing is sufficiently close to retain the lock rings of all except the outermost tank which, if desired, may utilize a clamping ring to retain its lock ring. A penetration manifold can be employed with the series-type system to permit ready coupling both of the pressure system and of the electrical leads which must extend from the test specimen exteriorly to test instrumentation. Other features, including special internal seals, will be described in greater detail.

BRIEF DESCRIPTION OF THE DRAWINGS

The invention is illustrated in the accompanying drawings of which

DETAILED DESCRIPTION OF THE INVENTION

Figure 1:
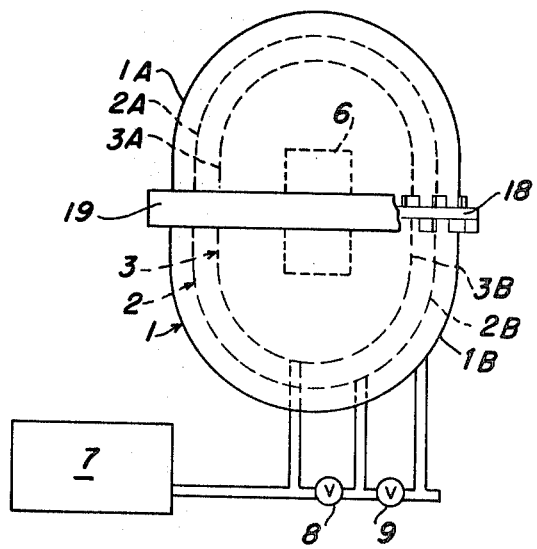
FIG. 1 is a schematic view of a series pressure tank system utilizing the tank structure of the present invention.

FIG. 1 is provided primarily to illustrate schematically the principle of operation applicable to series pressure tank systems. As there seen, the system employs three separate tanks 1, 2 and 3 each of which is formed by separable parts of halves 1a, 1b, etc., the halves being coupled one to the other by a special interconnection 5 to be described later in detail. A specimen 6, which may be a transducer or a hydrophone to be tested under extreme pressures, is mounted in inner tank 3 in any suitable manner, such as being suspended or otherwise secured to the tank wall. The walls of the tank are spaced one from the other to provide intervening chambers which are charged with successively increasing or decreasing pressures dependent upon whether a positive or negative pressure gradient is desired for the testing operation. For example, a 15,000 p.s.i.g. pumping system identified by numeral 7 in FIG. 1, may charge the chamber of interior tank 3 with a 15,000 p.s.i.g. Similarly, the chamber between tanks 2 and 3 may be charged to 10,000 p.s.i.g. and the exterior chamber charged to 5,000 p.s.i.g., pressure reducing valves 8 and 9 being used to create the pressure differentials. In an arrangement of this type, instead of the wall of tank 3 being subjected to the full 15,000 p.s.i.g., it is required to resist only the differential pressures on its opposite walls which amount to 5,000 p.s.i.g. The walls of the other tanks also are subjected only to this net differential pressure and thus may be correspondingly light, inexpensive and adaptable for the formation of the light but strong special interconnecting members used to couple together the separate parts of each tank unit.

In the testing operation, it, of course, is necessary first to mount specimen 6 in its test position in the interior tank and, to accomplish this purpose, it is desirable to provide access to the interior by separating the tanks. Also, in conducting the test, the tanks are pressurized and electrical leads are coupled to the specimen. These pressure and instrumentation leads must be passed from the interior tank to the exterior and, although they can be passed directly through the walls of the tanks, a special penetration manifold (not shown) also may be employed. Such a manifold is fully described in a copending U.S. Pat. application entitled "External-Frame Series-Pressure Tank Apparatus" presently identifiable as Navy Case No. 46472 filed on behalf of the inventor Orson L. Mitchell However, since such a manifold does not form a part of the present inventive novelty, a detailed understanding of its structure is not believed to be presently necessary.

Figure 2:
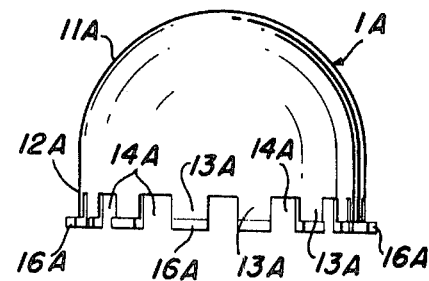
FIG. 2 is a view in elevation of an upper tank half.

To permit assembly and disassembly access to the tank interiors, the tanks are formed of a separable two-part construction provided by upper and lower halves 1a, 1b, etc., adapted to be joined and sealed to provide a unitary pressure-containing tank. As shown in FIG. 2, each tank half is formed as substantially a hemispherical member having a closed, hemispherical end portion 11 and a cylindrical free end portion 12. As will be understood, lower tank half 1b is formed in a manner identical with upper half 1a. To permit the two halves to be joined, each are formed with so-called merlon flanges 13A spaced one from the other by crenel notches 14A, the notches preferably being slightly larger than the merlon flanges to permit the merlon flanges of each of the members to fit into the notches of the other. The terms "merlon" and "crenel" will be recognized as rather common ordnance terms and, as will be seen in the drawings, these terms signify a ridged or parapetlike construction which, in more common terminology, simply is a succession of spaced teeth.

Figure 4:
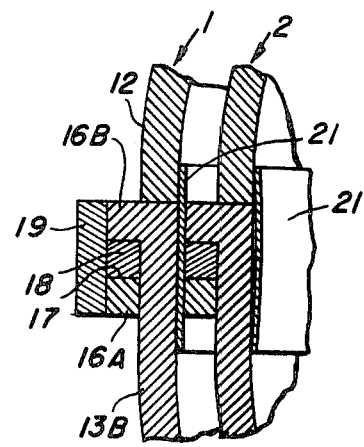
FIG. 4 is a sectional view taken along lines 4—4 of FIG. 3.

In the modification of the invention illustrated in FIG. 2, each of the merlon flanges is formed with a radially extending lug portion 16A and B, the contour of which perhaps is best shown in FIG. 4. These lug portions are circumferentially aligned along a peripheral free end extension of each of the tank ends and they are placed at the extreme end portions of each of the merlon flanges. Consequently, when the two tank ends are brought together so as to mesh or mate the merlons of one with the crenels of the other, lug portions 16A provide between themselves an outwardly facing, circumferentially, intermittent channel 17 in which a lock ring 18 can be placed to secure the meshed engagement of the two halves. A keeper ring 19 (FIG. 4) is used to radially restrain lock ring 18 to hold it in position, although, as also will be recognized, if a series tank arrangement such as that illustrated in FIG. 1 is employed, the wall spacing may be sufficiently close to hold them in place. In other words, the series pressure system permits the use of a keeper ring only about the lock ring of exterior tank 1. As will be appreciated the wall spacing of the concentric tanks can be achieved by using radially extending lugs 16A as spacer members. If so, the interior wall of tank 1, for example, will bear against the outer ends of lugs 16 to not only hold lock ring 18 in the channel but also to maintain the spacing between tanks 1 and 2. It also might be noted at this point that the modifications of FIGS. 5–8 permit the radial spacing of a series of tanks to be achieved in the same manner since each of these modifications includes radial extensions or thickenings of the meeting or free ends of the tank halves and these extensions can be used as spacer members.

Figure 3:
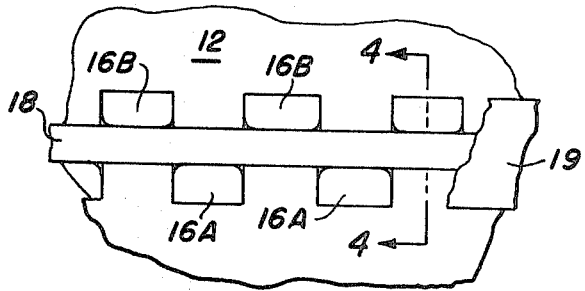
FIG. 3 is a fragmentary enlarged view showing the mated arrangement of the upper and lower tank halves.

It also is necessary to provide a seal for each of the tanks since, as perhaps best can be realized by viewing FIG. 3, there will be a leakage path formed circumferentially about the interior of each tank, this path, of course, following the square wave path defined by the merlon flanges and their notches. The preferred form of seal for the type of connection illustrated in FIGS. 2–4 is a classic ordnance cartridge case seal provided by a thin wall tapered sealing ring 21 which is of sufficient width to cover the total depth of the tank interconnection and overlap the surface areas on either side of the interconnection. The interior pressure of each tank is sufficient to force the tapered seal ring against the inside and produce an effective seal. If desired, an auxiliary seal may be utilized at the outer edges of the rings to ensure seal during initial low pressure periods before buildup to the pressure required for the cartridge case seal.

Figure 5:
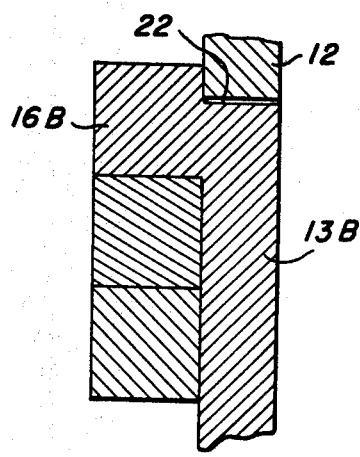
FIGS. 5 and 6 are views similar to FIG. 4 but showing modifications in the tank construction.
Figure 6:
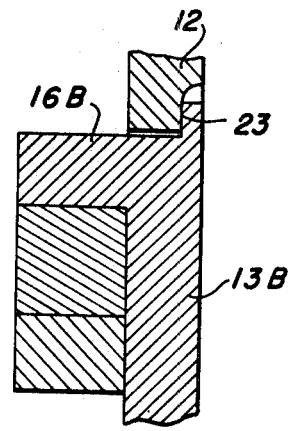

FIGS. 5 and 6 represent a modification adapted to better resist or counter angular bending forces exerted on the merlon flange interconnection. FIG. 5 shows a lug 16b similar to lug 16b of FIG. 3 except that it is enlarged to provide a detent and notch 22 providing an overhang to counter the moment due to the lock ring force and, consequently, to stabilize the merlon. FIG. 6 shows another manner in which lug 16b can be enlarged to provide an equivalent detent and notch 23 adapted to engage in a notch 24 formed on the interior wall of the tank, such an arrangement providing an underhang to counter the outward force of the internally pressurized tank, this force, as well as the lock ring force of FIG. 5, both tending to counteract angular or bending distortions of the connections. Obviously, if desired, the modifications of FIGS. 5 and 6 can be combined. Other features of FIGS. 5 and 6 are the same as those previously described with reference to FIGS. 2–4 and the mated engagement of the merlon flanges and crenel notches would be the same as is illustrated in FIG. 3. Further the modifications of FIGS. 5 and 6 can be provided for all of the tanks employed in any pressure tank system such, for example, as the nested arrangement of tanks 1, 2 and 3 of FIG. 1. The same is true of the FIG. 7 and 8 modifications.

Figure 7:
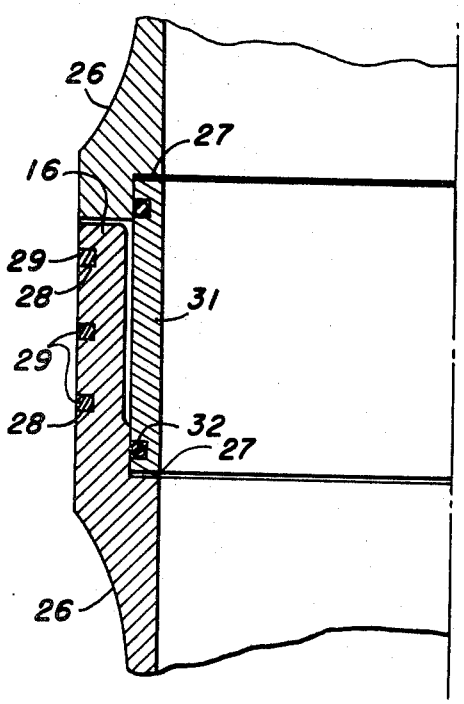
FIGS. 7 and 8 illustrate other embodiments of the invention permitting the use of special sealing members and modifications in the lock ring arrangements.
Figure 8:
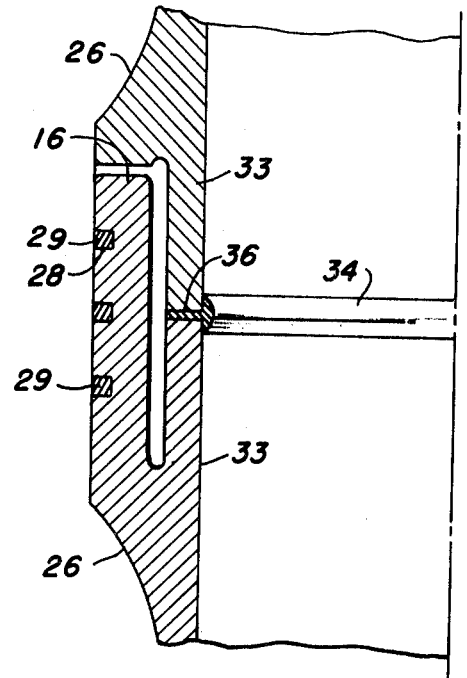

FIGS. 7 and 8 both show modifications utilizing plural lock rings and also employing different sealing arrangements. In FIG. 1, the cylindrical free ends of each half of the tank are thickened by and outwardly beveled portion 26, while the interior walls of these free end portions are formed with notches 27. Merlon flanges 13A project outwardly of the free ends of the tank halves exteriorly of notches 27 and, instead of the single continuous intermittent channel 17 shown in FIG. 4, this modification utilizes plural recesses 28 to form plural intermittent channels each of which mount separate lock rings 29. Sealing member 21, instead of being the thin wall tapered cartridge seal of FIG. 4, is a relatively thick seal ring 31 received in notches 27 and the sealing action is augmented by O-rings 32.

The modifications of FIG. 8 are similar in a number of respects to those described with reference to FIG. 7. Thus, the merlon flanges are formed in the same manner and extend outwardly from thickened portions of the tank walls. Also, plural lock rings identical to those of FIG. 7 are utilized. The principal difference is that the free ends of each half of the tank, instead of terminating in notched portions 27 as shown in FIG. 7, are extended one toward the other to provide flanged portions 33 which, when the halves are mated lie in close proximity one to the other. Such an arrangement permits the use of a narrow circumferential sealing member 34 which as shown in FIG. 8, has a radial projecting portion 36 tightly fitting into the jointure gap between flange members 33. In both FIGS. 7 and 8 the merlon and crenel mating is, except for relative proportions, the same as that shown in FIG. 3.

The operation of the various embodiments should be reasonably apparent from the foregoing description. Thus, unless a penetration manifold is employed, a test procedure commences by separating each tank to permit the mounting of samples 6 in the interior of innermost tank 3. Instrumentation leads for the specimen (not shown) can be permanently mounted and sealed so as to pass to the exterior through the tank walls and the same can apply to the pressurizing conduits for the tank. The tanks then can be assembled commencing, of course, with tank 3 and one of the present features is the fact that the assembly can be accomplished with unusual speed and ease and without the need for any special tools, bolts, nuts, etc. Prior to the assembly of each tank, the sealing member is placed so as to overlap the intermittent continuous channel formed by the merlons and crenels and, although such a channel has an exceptionally long, square wave leakage path, the sealing arrangements previously described are most effective particularly since the system utilizes the differential pressure concept on each tank wall so that each sealing member is subjected to minimum pressures. Once the tanks have been assembled, the instrumentation leads are connected exteriorly of the system and the tanks are brought up to the desired pressures needed for the test purposes. Following the test, it becomes a relatively simple matter to cut off the pressure, detach the instrumentation leads and separate the tank halves to permit the removal of the specimen.

One of the principal features of the present arrangement is derived from the use of the series pressure system in that, as already explained, such a system enables the use of relatively light tank walls and also the use of relatively light and simple interconnections such as the merlon flanges. Also, due to the relative lightness of the structure, the size and cost of the apparatus is materially reduced and the handling problems are minimized. In general, the apparatus has proven to be an unusually effective, easily handled, low cost, simplified structure which has significantly expedited and simplified the testing operations.

Obviously many modifications and variations of the present invention are possible in the light of the above teachings. It is therefore to be understood that within the scope of the appended claims the invention may be practiced otherwise than as specifically described.

I claim:
1. Pressure tank apparatus comprising:
   a casing formed of two parts each having a closed end portion and a substantially cylindrical free end portion,
   said cylindrical free end portions having matable end sections each formed with merlon-type flanges spaced one from the other by crenel-type notches,
   said spacing permitting the merlon flanges of one part to mesh into the crenel notches of the other part and said merlon flanges each being formed with a lug portion projecting radially outwardly of its free end portion a distance beyond the outer periphery of the cylindrical body portion for providing a circumferentially extending outwardly facing intermittent channel,
   a lock ring disposed in said circumferential channel for interlocking said mated engagement,
   means extending around the lock ring for radially retaining said lock ring in said outwardly facing channel,
   sealing means disposed interiorly of the casing for sealing said intermittent channel to render said casing fluid tight; and
   means for pressuring said casing.

2. The apparatus of claim 1 wherein the apparatus is formed of a series of said casings disposed concentrically one within another and spaced one from another to provide separate pressure chambers,
   said pressuring means including means for pressurizing each chamber for establishing progressively diminishing pressures in adjacent chambers, and
   said lock ring retaining means including a clamping ring disposed outwardly of and bearing against the lock ring of the outermost casing.

3. The apparatus of claim 1 wherein said sealing means is formed of a relatively wide thin walled flexible sealing member, the width of said sealing member being greater than the depth of said crenel notches for sealably overlapping said intermittent channel, said pressuring means forcing said sealing means into a sealable contact with the casing interior in which the member continuously overlaps said channel.